Figure 1:
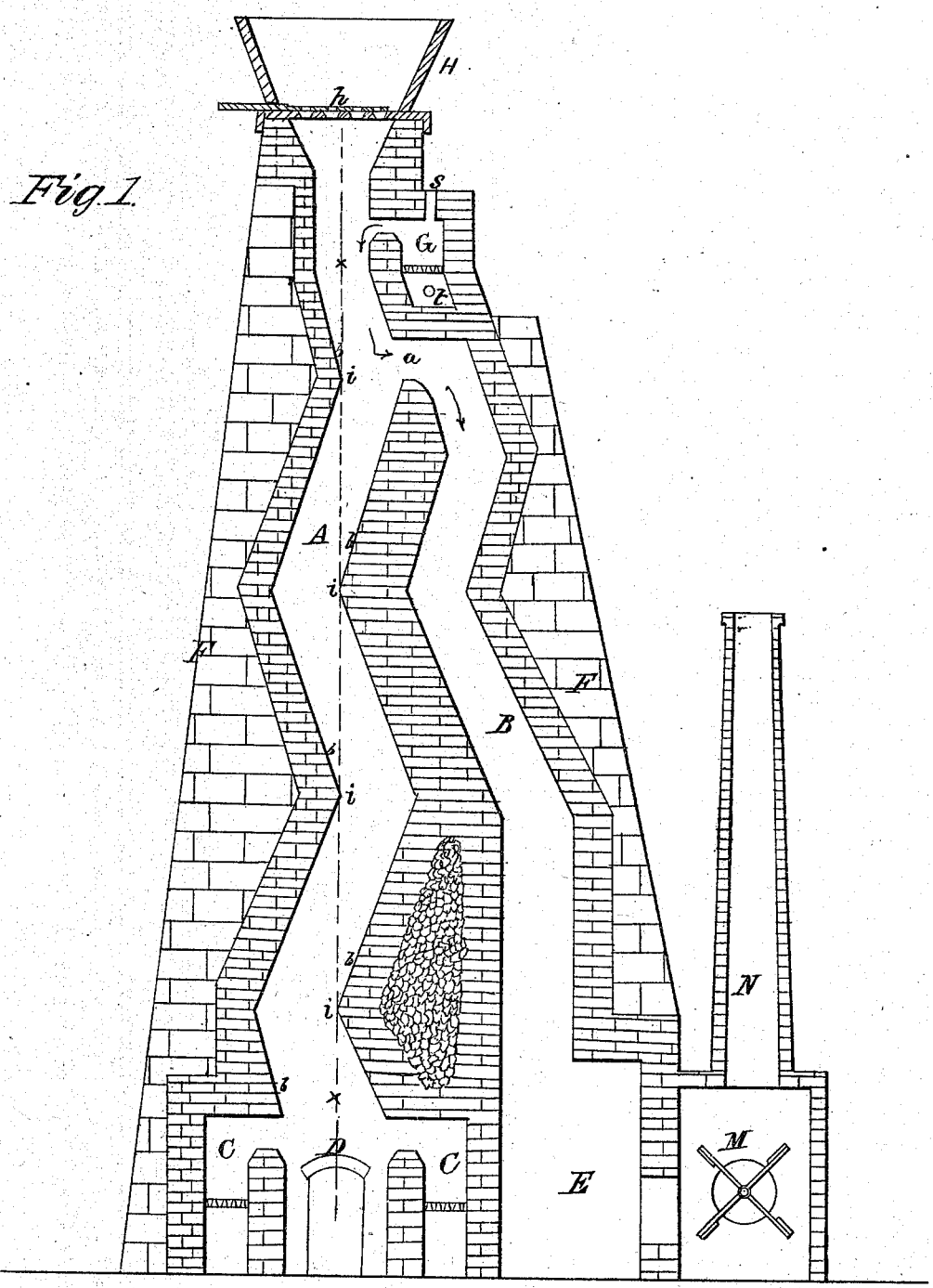

J. P. AREY.
FURNACE FOR ROASTING, OXIDIZING, AND CHLORIDIZING ORES.
No. 103,006. Patented May 17, 1870.

Witnesses.

Inventor
John P. Arey
by his attys
Mason, Fenwick & Lawrence

UNITED STATES PATENT OFFICE.

JOHN P. AREY, OF GEORGETOWN, COLORADO TERRITORY.

IMPROVEMENT IN FURNACES FOR ROASTING, OXIDIZING, AND CHLORIDIZING ORES.

Specification forming part of Letters Patent No. 103,006, dated May 17, 1870.

*To all whom it may concern:*

Be it known that I, JOHN P. AREY, of Georgetown, in the county of Clear Creek and Territory of Colorado, have invented a new and Improved Furnace for Roasting, Oxidizing, and Chloridizing Ores; and I do hereby declare that the following is a full, clear, and exact description thereof, reference being had to the accompanying drawings making part of this specification, in which—

Figure 1 is a vertical section through the improved furnace.

My invention relates to improvements on furnaces which are designed for roasting, oxidizing, and chloridizing ores and metallic products, and consists, first, in constructing the shaft, or that portion of the flue through which the substance to be treated is dropped, of a zigzag or serpentine form, whereby the heat in the shaft is equalized from wall to wall, and the ascending products of combustion are caused to cross and recross the descending ore or metallic product, and thus, in a comparatively short vertical space, become thoroughly heated and deprived of their foreign volatile matters, as will be hereinafter explained; second, in so arranging an auxiliary furnace or fire-place, with reference to either a serpentine or straight shaft or flue, through which ores or metallic products are dropped, for the purpose of roasting, oxidizing, and chloridizing them, that such products will be subjected to the direct action of the heat of said furnace or fire-place, and thereby partially heated before they are brought under the influence of the heated products ascending from the main furnace in the lower part of said shaft or flue, as will be hereinafter explained; third, in arranging fire-chambers at or near the base of a serpentine flue, and on opposite sides of the receiving-chamber, into which the treated material falls, as will be hereinafter explained.

To enable others skilled in the art to understand my invention, I will describe its construction and operation.

In the accompanying drawings, A represents the shaft of the furnace, which is formed within the walls F, rising in a serpentine or zigzag manner from an accumulating-chamber, D, and terminating at the summit of the furnace, at which latter point the ore is fed into this shaft. B is an escape-flue, which may be of the serpentine form shown, or it may be straight. This flue leads out of the shaft A, near the upper end thereof, and terminates in the dust-chamber E at the base of the furnace. On opposite sides of the chamber D fire-places C C are constructed, the heated products from both of which pass over the bridge walls, meet at the base of the shaft A, and thence rise through this shaft to and through the transverse passage *a* leading into the upper end of the descending flue B, as shown in the drawings. Near the upper end of the shaft A, and on one side of this shaft, is a fire-chamber, G, the products of combustion from which pass into the shaft A, thence off through the transverse flue *a* into the main outlet-flue B, as indicated by the arrows in the drawings. This auxiliary fire-place is preferably arranged over the short flue *a*, so that the heated products will be compelled to descend for a short distance through shaft A before escaping therefrom. I do not, however, confine myself to this arrangement of the fire-place G, as it may be located below or opposite the short flue *a*, or in any other manner which will compel the heated products rising from it to first enter shaft A before escaping into an outlet-flue. At the upper end of the shaft A I have arranged a feeder, consisting of a hopper, H, having perforations or oblong slots through its bottom, and a correspondingly-perforated slide, *h*, so applied that, by giving it a reciprocating motion, the ore or the metallic product to be treated will be regularly fed into the shaft. The slide will admit of adjustment, by regulating its length of stroke, for regulating the amount of material fed through at each stroke. I prefer to adopt a feeder substantially as above described, although any other which will answer a good purpose may be employed.

It will be seen by reference to the annexed drawings that the shaft A presents a number of inclined or zigzag planes, and that the prominent angles *i* of the opposite sides of this shaft, from bottom to top thereof, are in, or nearly in, the same vertical plane which is indicated by the dotted line *x x* in the drawing. Thus it will be seen that the ore, while falling in streams through the shaft, will be crossed and recrossed by the currents of heated products rising from the lower end of the shaft. Also, that the zigzag course of the shaft A will cause the heated currents to circulate freely through the spaces on opposite sides of the descending streams of ore, and uniformly heat the shaft throughout its length. Also, that a great length of shaft is obtained in a comparatively short furnace.

It will also be seen that I employ an auxiliary fire-place near the upper end of the shaft A, which fire-place is furnished with its own draft-passages, and so arranged that the ore crosses the highly-heated products escaping therefrom previous to being brought under the direct influence of the heated currents ascending from the lower part of the shaft, by which means the ore is brought to a condition for being more readily acted upon while falling through the shaft.

Another advantage attending the auxiliary fire-place G is that the flame therefrom, entering the shaft so near the common escape-flue, will pass into this flue along with the dust, which is either too light to pass below or which may be carried into the flue by the draft, and, mingling with the escaping heat and gases, will become thoroughly roasted before it reaches the dust-chamber E. Thus a twofold office is performed by this auxiliary fire-place.

I am aware that Charles Stetefelot shows, in his Letters Patent of the United States, numbered 72,931, and dated December 31, A. D. 1867, an ore-roasting furnace, with supplemental fire-place arranged in the escape-flue, but this is not so arranged that its heated products are caused to impinge upon the body of ore falling through the shaft, as I have above described in reference to the action of the heat from the fire-place G. I do not, therefore, claim as my invention such an arrangement of fire-place as is shown by said Letters Patent; nor do I claim broadly the principle of treating ores by letting them fall through ascending currents of heat; nor do I claim the arrangement of shelves or inclined planes in a vertical shaft, as is shown in Letters Patent numbered 43,129. Such shelves or inclined planes offer obstructions to the free ascending currents of heat, by producing eddies beneath each one of the shelves, while with my zigzag shaft no such obstructions are made. They also tend to clog the shaft.

In order to successfully operate a furnace having the ascending zigzag shaft and the descending flue B, leading into the dust-chamber E, I employ a fan at the base of the chimney M, which will be rotated faster or slower, according to the force of draft required, and to start the fire in the auxiliary fire-place G, draft-dampers may be opened below and above the fire. These dampers are applied in practice opposite the passages s t.

I do not claim roasting or desulphurizing ores by passing them in fine powder through a shaft, together with the products of combustion, in the manner and principle as is described in the patent granted to Whelpley and Storer, January 12, 1864.

Having described my invention, what I claim as new, and desire to secure by Letters Patent, is—

1. The zigzag or serpentine shaft A, in a furnace for roasting, oxidizing, and chloridizing ores or metallic products, constructed substantially as described.

2. In a furnace for roasting, oxidizing, and chloridizing ores or metallic products, the auxiliary fire-place G, arranged above one or more main fire-places, in such relation to the shaft A that the ore falling through this shaft will be subjected to the direct action of the heat passing from said fire-place, as well as that from the main fire-places, substantially as described.

3. In a furnace for roasting, oxidizing, and chloridizing ores or metallic products, the fire-places C, combined with and arranged at or near the base of a zigzag shaft, A, in combination with the fire-place G, which leads directly into the shaft, substantially as described and for the purpose set forth.

4. In a furnace for roasting, oxidizing, and chloridizing ores or metallic products, the relative arrangement of the escape-flue a, the fire-place G, and a feeder, with respect to a shaft, A, or its equivalent, substantially as described.

5. In a furnace for roasting, oxidizing, and chloridizing ores or metallic products, the descending flue B, in combination with the shaft A, receiving-chamber E, and a suction-fan, M, substantially as described.

JOHN P. AREY.

Witnesses:
K. HASKINS,
R. W. CLARKE.